United States Patent

Lancaster

[15] 3,696,509

[45] Oct. 10, 1972

[54] DIES FOR CUTTING ELECTRICAL CABLE

[72] Inventor: Robert W. Lancaster, Haven, Kans.

[73] Assignee: Panhandle Eastern Pipe Line Company, Houston, Tex.

[22] Filed: Sept. 10, 1970

[21] Appl. No.: 71,008

[52] U.S. Cl. ................................................ 30/90.6
[51] Int. Cl. ........................................... B26b 17/02
[58] Field of Search ............ 30/90.1, 90.6, 90.7, 90.8, 30/91.2

[56] References Cited

UNITED STATES PATENTS

| | | | |
|---|---|---|---|
| 1,022,679 | 4/1912 | Huston | 30/90.6 X |
| 3,122,036 | 2/1964 | Flower | 30/91.2 |
| 3,237,300 | 3/1966 | Townsend | 30/90.6 |

Primary Examiner—Theron E. Condon
Assistant Examiner—J. C. Peters
Attorney—Hyer, Eickenroht, Thompson & Turner

[57] ABSTRACT

Two mating die bodies are each equipped with cutoff blades that mate when the die bodies are moved together. With an electric cable between the die bodies, these blades cut the cable. Also carried by each of the die bodies are indenting blades that form circumferential indentations and longitudinally extending indentations in the insulation around the conductor of the cable. This allows the insulation to be stripped from the conductor easily and rapidly after the cable has been cut.

1 Claim, 8 Drawing Figures

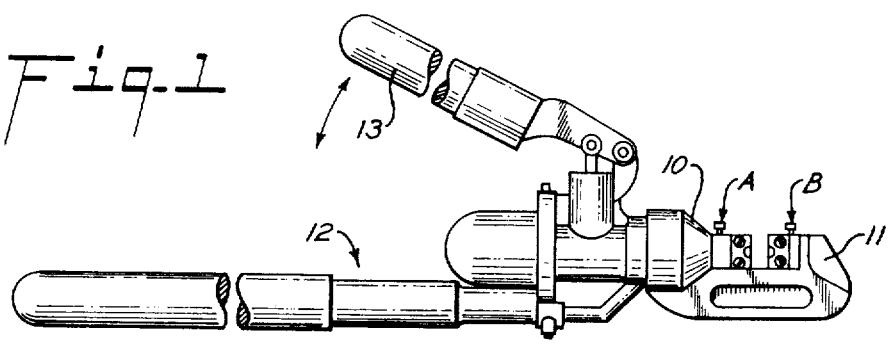
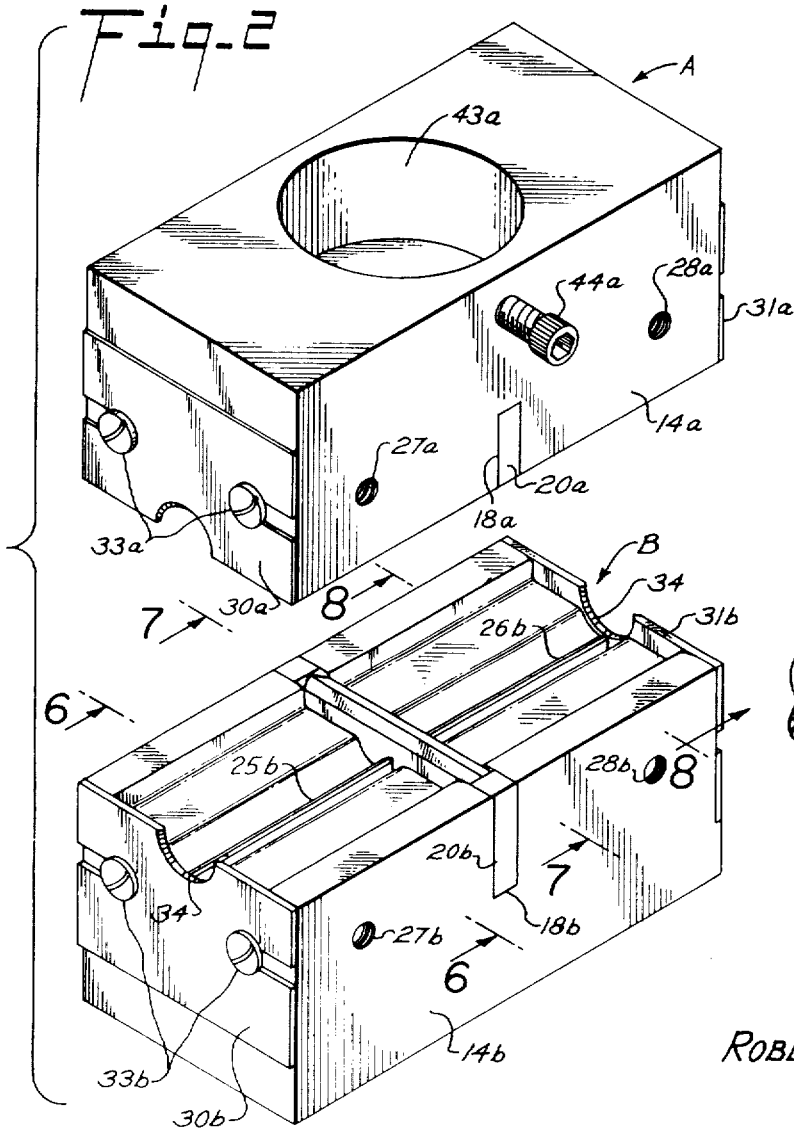
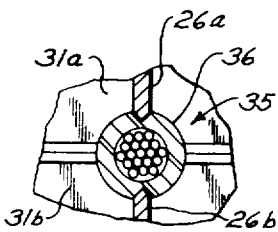
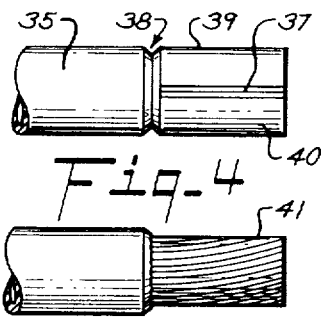
ROBERT W. LANCASTER
INVENTOR.
ATTORNEYS

ROBERT W. LANCASTER
INVENTOR.

ATTORNEYS

DIES FOR CUTTING ELECTRICAL CABLE

This invention relates to dies for cutting electrical cable.

One of the most time-consuming operations in the installation of electrical circuits is the removal of insulation from the ends of the cables to be connected together. This is particularly true in multiple conductor cables where the insulation is often tough and stiff, and care must be exercised not to damage any of the conductors in the conductor bundle.

It is an object of this invention to provide apparatus for cutting insulated electrical cable that will form indentations in the insulation surrounding the cable at the same time the cable is cut to the desired length to thereby allow the insulation adjacent the end of the cut cable to be quickly and easily removed therefrom.

It is another object of this invention to provide apparatus for cutting insulated electrical cable that will reduce to a minimum the possibility of damage to the conductor portion of the cable while indenting the insulation surrounding the conductor portion so that the insulation can be readily removed.

It is another object of this invention to provide dies for cutting electrical cable that will simultaneously prepare the insulation adjacent the end of the cable for quick and easy removal to expose the conductors in the cable for splicing into another cable.

These and other objects, advantages, and features of this invention will be apparent to those skilled in the art from a consideration of this specification, including the attached drawings and appended claims.

In the drawings:

FIG. 1 is a side view in elevation of the preferred embodiment of the cable cutting dies of this invention showing the dies mounted in a tool for moving the dies together to cut electrical cable;

FIG. 2 is an exploded perspective view on an enlarged scale of the dies of FIG. 1;

FIG. 3 is a partial sectional view through a portion of electric cable as the dies close on the cable;

FIG. 4 is a view of one end of electric cable after it has been cut by the dies of FIG. 1;

FIG. 5 is a view of the end of electric cable of FIG. 4 after the insulation has been removed from the end of the cable;

The cutting dies of this invention include die assemblies A and B. These die assemblies mate and cut the cable when they are moved together. As shown in FIG. 1, the die assemblies are mounted between jaws 10 and 11 of hand-operated, hydraulically powered compression tool 12. Jaw 11 is stationary with respect to the rest of the tool. Jaw 10 is moved toward or away from jaw 11 as desired by operating handle 13. The tool for moving the dies together and apart does not form any part of this invention and therefore will not be described in detail. One such tool that can be used is a Kearney, Type WH-1 Hydraulic Compression Tool.

Die assemblies A and B are shown on an enlarged scale in FIG. 2. The two die assemblies are of identical construction. The numbers given to the parts associated with die assembly A will be given the suffix $a$; with die assembly B, the suffix $b$. Generally, only one such part will be described in detail.

Figure 7:
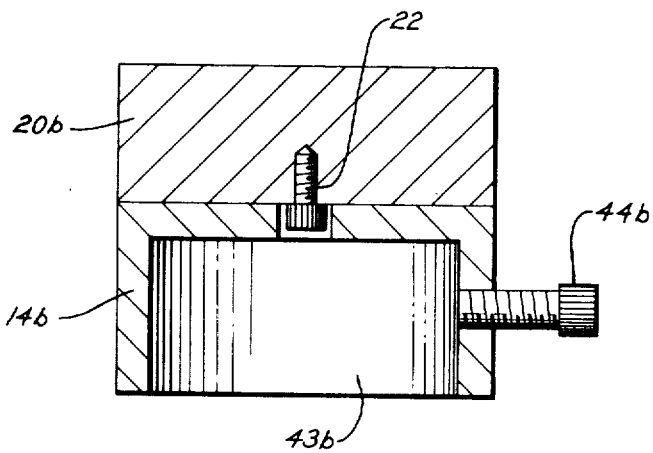
FIG. 7 is a sectional view similar to FIG. 6 taken along line 7—7 of FIG. 2.

Die assemblies A and B include die bodies 14$a$ and 14$b$. Means are carried by the bodies for cutting an electric cable located between the die bodies when the bodies are moved together. In the embodiment shown, die body 14$b$ has arcuate groove 16$b$ extending lengthwise of the body and groove 18$b$ extending transverse the body about equidistant between its ends. Groove 16$b$ is located in a recess in the side of the body and has the same radius of curvature as the electric cable to be cut. Mounted in groove 18$b$ cutoff blade 20$b$. The blade is releasably attached to body 14$b$, as shown in FIG. 7, by Allen screw 22. Die body 14$a$ is similarly equipped with cutoff blade 20$a$ located in transverse groove 18$a$.

Figure 6:
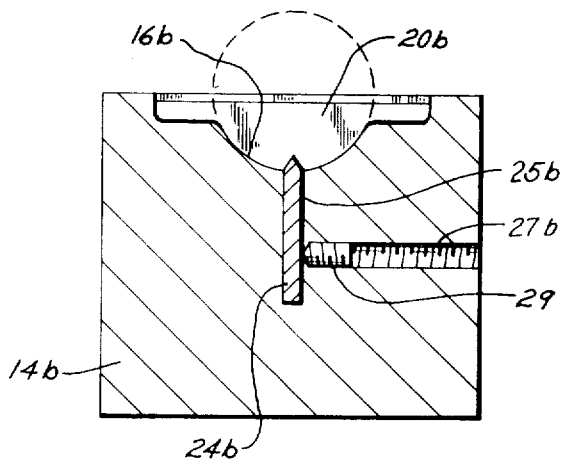
FIG. 6 is a cross-sectional view taken along line 6—6 of FIG. 2.
Figure 8:
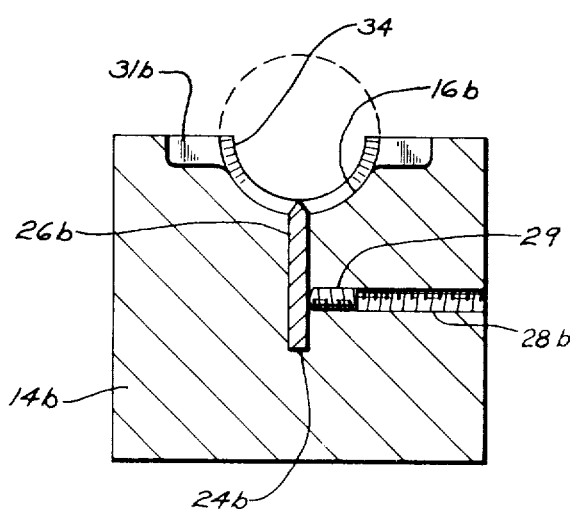
FIG. 8 is a sectional view similar to FIG. 6 taken along line 8—8 of FIG. 2.

Means are carried by the die bodies for indenting the insulation on an electric cable both circumferentially a preselected distance on either side of where the cable is cut by the cutoff blades and longitudinally between the cut and the circumferential indentations to permit the insulation to be readily removed from the cable adjacent the cut ends thereof. In the embodiment shown and as best seen in FIGS. 6 and 8, body 14$b$ is provided with longitudinally extending, rather narrow groove 24$b$ at the bottom of groove 16$b$. Located in this groove on opposite sides of cutoff blade 20$b$ are elongated indenting members 25$b$ and 26$b$. Tapped holes 27$b$ and 28$b$ are drilled from the side of body 14$b$ to allow indenting members 25$b$ and 26$b$ to be held in groove 24$b$ by set screws 29.

The indenting means carried by die body 14$b$ also includes indenting plates 30$b$ and 31$b$. These plates are attached to the end of die body 14$b$ by machine screws 33$b$. Each indenture plate is equipped with a semicircular groove 34 that is sharp enough to indent the insulation on the electrical cable being cut by the dies. The upper edges of elongated indenture members 25$b$ and 26$b$ are also sharpened.

Thus, with die assemblies A and B mounted in the compression tool as shown in FIG. 1, a cable can be cut, and when it is removed from between the dies, one end will look like the end of cable 35 shown in FIG. 4. Cutoff blades 20$b$ and 20$a$, 20$a$ being carried by die body 14$a$, will come together as the two die assemblies A and B are moved together by jaw 10 to sever the cable into two pieces. Simultaneously with the closure of die assemblies A and B, elongated indenture members 25$a$ and 25$b$ and 26$a$ and 26$b$ will penetrate insulation 36 of cable 35, as shown in FIG. 3, forming longitudinal indentations, such as indentation 37 shown in FIG. 4. This indentation will be formed in both of the ends of the cable formed when the cable is cut in two by the dies and on opposite sides of the cable. Only one end is shown in the drawings, but both ends of the cut cable will be indented in the same way. At the same time indenting plates 30$b$ and 31$b$ will mate with indenting plates 30$a$ and 31$a$ to form circumferential indentations a preselected distance from the end of the cable. Such an indentation is indicated in FIG. 4 by the number 38.

As shown, these indentations do not necessarily penetrate completely through layer 36 of insulation, but the tolerances by which the dies are constructed could be such that the indentation means could substantially penetrate this insulation layer. The depth of indentation is determined by the distance the indentation means, such as members 25b and 26b and edge 34 of the plates, extend above arcuate groove 16b. Indentations that do not go completely through the insulation, however, serve the purpose in most cases. With the insulation so indented, it is a simple matter to grasp portions 39 and 40 of the insulation with a pair of pliers and break them away from the main body of insulation on the other side of indentation groove 38. This will expose conductor bundle 41 of the multi-conductor cable shown in the drawings and in condition for connecting into another cable or a connector of some sort.

In the embodiment shown, the two die assemblies A and B are mounted on circular stub shafts (not shown) attached to jaws 10 and 11 of the compression tool shown in FIG. 1. To accommodate these shafts and provide for this mounting, the backside of die bodies 14a and 14b are provided with mounting openings 43a and 43b. Set screws 44a and 44b hold the die bodies in position on these circular stub shafts and on jaws 10 and 11.

From the foregoing, it will be seen that this invention is one well adapted to attain all of the ends and objects hereinabove set forth, together with other advantages which are obvious and which are inherent to the apparatus.

As many possible embodiments may be made of the invention without departing from the scope thereof, it is to be understood that all matter herein set forth and shown in the accompanying drawings is to be interpreted as illustrative and not in a limiting sense.

The apparatus having been described, what is claimed is:

1. Cutting dies for simultaneously cutting an electric cable and indenting the insulation adjacent the cut for easy removal from the central core of the cable, comprising two die bodies for moving together to clamp an electric cable between them, each body having an elongated groove semicircular in cross section to receive a cable with the longitudinal axis of the cable parallel to the longitudinal axis of the grooves, a groove transverse the first mentioned groove, a cutoff blade positioned in the transverse groove to cooperate with the cutoff blade in the other body to cut through a cable when the two die bodies are moved together, means releasably holding the cutoff blade in the transverse groove in position to cut the desired distance into a cable, elongated slots in the body extending on opposite sides of the transverse groove and located in the bottom of the cable receiving groove, an insulation indenting member located in said slots on each side of the cutoff blade to indent the insulation of the cable longitudinally from where the cable is cut by the cutoff blades, means releasably holding the indenting members in the slots, and an indenting plate releasably attached to the body on opposite ends to form a circumferential indentation in the insulation on a cable so that when the two die bodies are moved together with a cable between them the cable is cut by the cutoff blades and the insulation is indented for easy removal for a distance on each side of the cut.

* * * * *